(12) United States Patent
Jones

(10) Patent No.: US 8,622,329 B1
(45) Date of Patent: Jan. 7, 2014

(54) COMBINED PEPPER GRINDER AND SALT SHAKER

(71) Applicant: George R. Jones, Naples, FL (US)

(72) Inventor: George R. Jones, Naples, FL (US)

(*) Notice: Subject to any disclaimer, the term of this patent is extended or adjusted under 35 U.S.C. 154(b) by 0 days.

(21) Appl. No.: 13/952,719

(22) Filed: Jul. 29, 2013

(51) Int. Cl.
A47J 42/06 (2006.01)

(52) U.S. Cl.
USPC ........................................ 241/169.1

(58) Field of Classification Search
USPC .............................. 241/169.1, 168
See application file for complete search history.

(56) References Cited

U.S. PATENT DOCUMENTS

| | | | |
|---|---|---|---|
| 595,481 A | 12/1897 | Fischer |
| 1,264,134 A | 4/1918 | Quick |
| 2,974,887 A | 3/1961 | Grandinetti |
| 3,154,220 A | 10/1964 | Koralewski |
| 3,157,315 A | 11/1964 | Bianco |
| 3,485,416 A | 12/1969 | Fohrman |
| 3,827,641 A | 8/1974 | Andersson |
| 4,685,627 A | 8/1987 | Lee |
| D302,508 S | 8/1989 | Persoff |
| D305,196 S | 12/1989 | Persoff |
| 5,145,119 A | 9/1992 | Lowe |
| 7,066,418 B2 | 6/2006 | Ng |

Primary Examiner — Mark Rosenbaum
(74) Attorney, Agent, or Firm — The Livingston Firm; Edward M. Livingston, Esq.; Bryan L. Loeffler, Esq.

(57) ABSTRACT

A combined pepper grinder and salt shaker (1) having an upper portion (2) of the device that stores salt and also having apertures (3) to dispense the salt. A bottom portion (9) comprises a pepper mill that grinds peppercorn. The upper portion attaches to the bottom portion via a pressure fit clip-top shell (20), spring retaining ring (21) and push buttons (22), that allow a user to easily remove the upper portion from the bottom portion.

8 Claims, 2 Drawing Sheets

COMBINED PEPPER GRINDER AND SALT SHAKER

FIELD OF THE INVENTION

This invention relates to a device that combines a salt shaker with a pepper grinder.

BACKGROUND OF THE INVENTION

Devices dispensing salt and pepper have conventionally entailed the use of separate shaker containers and/or grinders. Dual chamber dispensers have also been devised wherein each of the chambers store and dispense salt and pepper, respectively. However, such dispensers have not been comprised of a structure that enables a user to easily fill the device with salt and peppercorn.

Therefore, a need exists for a combined pepper grinder and salt shaker that will allow a user to easily dismantle the device to be able to fill it with salt and peppercorn.

The relevant prior art includes the following references:

| Pat. No. | Inventor | Issue/Publication Date |
| --- | --- | --- |
| (U.S. Pat. References) | | |
| 595,481 | Fischer | Jul. 30, 1897 |
| 1,264,134 | Quick | Apr. 23, 1918 |
| 2,974,887 | Grandinetti | Mar. 14, 1961 |
| 3,154,220 | Koralewski | Oct. 27, 1964 |
| 3,157,315 | Bianco | Jan. 17, 1964 |
| 3,485,416 | Fohrman | Dec. 23, 1969 |
| 3,827,641 | Andersson | Aug. 06, 1974 |
| 4,685,627 | Lee | Aug. 11, 1987 |
| D302,508 | Persoff | Aug. 01, 1989 |
| D305,196 | Persoff | Dec. 26, 1989 |
| 5,145,119 | Lowe | Sep. 08, 1992 |
| 7,066,418 | Ng | Jun. 27, 2006 |

SUMMARY OF THE INVENTION

The primary object of the present invention is to provide a combined pepper grinder and salt shaker that will allow a user to easily dismantle the device to be able to fill it with salt and peppercorn.

The present invention fulfills the above and other objects by providing a combined pepper grinder and salt shaker having an upper portion of the device that stores salt and also has apertures dispensing the salt. A bottom portion comprises a pepper mill that grinds peppercorn. The upper portion attaches to the bottom portion via a pressure fit clip-top shell and spring retaining ring and push buttons, that allow a user to easily remove the upper portion from the bottom portion.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
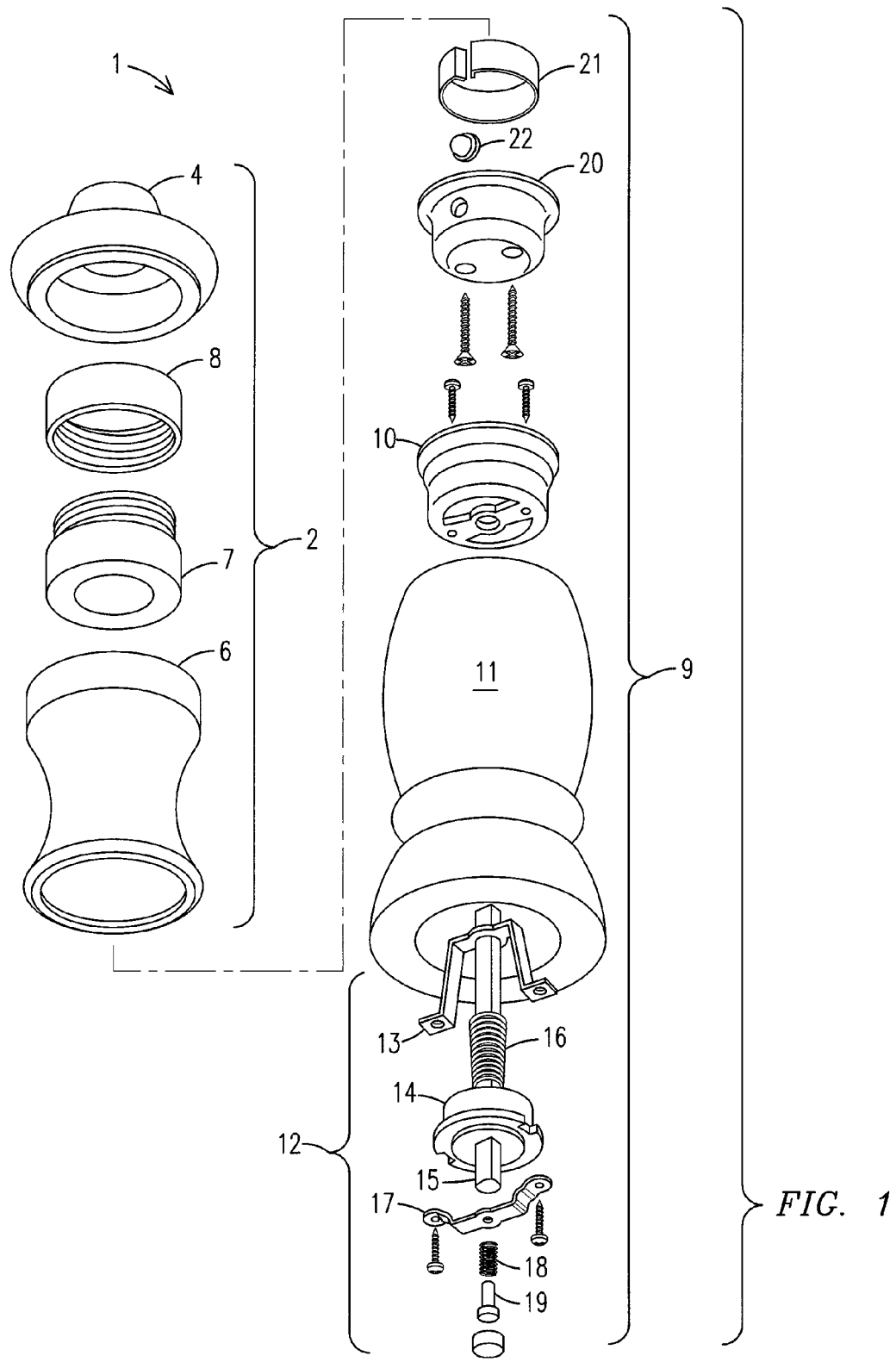
FIG. 1 is an exploded view of a combined pepper grinder and salt shaker of the present invention.
Figure 2:
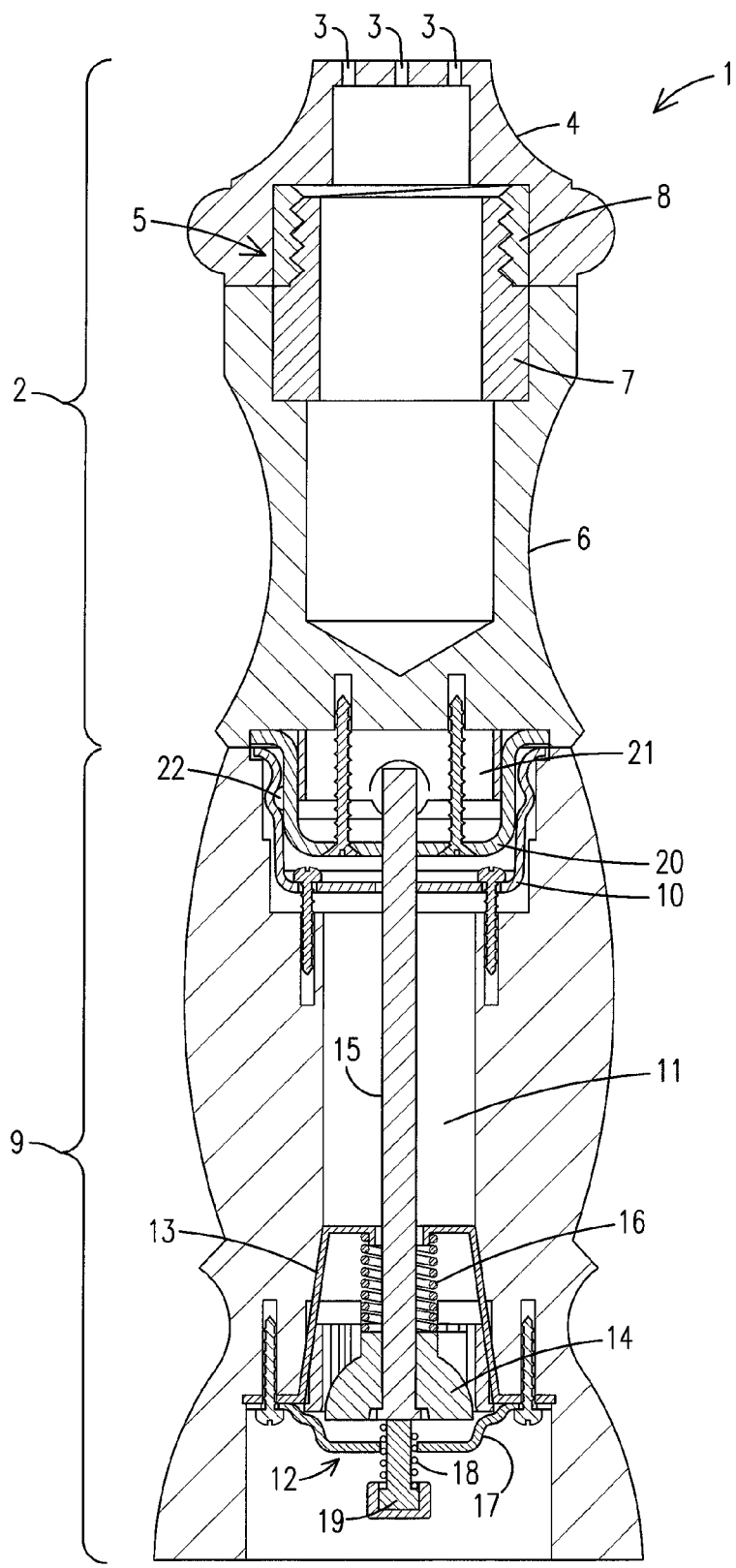
FIG. 2 is a cross sectional view along lines 2-2 of FIG. 1 of a combined pepper grinder and salt shaker of the present invention.

For purposes of describing the preferred embodiment, the terminology used in reference to the numbered accessories in the drawings is as follows:

1. combined pepper grinder and salt shaker, generally
2. upper portion
3. aperture
4. shaker top
5. attachment means
6. first tubular storage area
7. male threaded insert
8. female threaded insert
9. bottom portion
10. pepper grinder
11. second tubular storage area
12. grinding assembly
13. spring bar guide
14. grinder ring
15. shaft
16. grinder assembly spring
17. plate adjuster
18. spring adjusting screw lock
19. adjusting screw
20. clip-top shell
21. spring retaining ring
22. push button With reference to FIGS. 1 and 2, an exploded view and a cross sectional view along lines 2-2 of FIG. 1 of a combined pepper grinder and salt shaker of the present invention are illustrated. The combined pepper grinder and salt shaker 1 comprises an upper portion 2 of the device that stores salt and also has apertures 3 for dispensing salt. The upper portion further comprises a shaker top 4 and an attachment means 5 for attaching the shaker top 4 to a first tubular storage area 6. The attachment means 5 may be a male threaded insert 7 and a corresponding female threaded insert 8 that attach into the shaker top 4 and the first tubular storage area 5, thereby allowing the shaker top 4 to be removed to allow for replacement of salt or other spices.

A bottom portion 9 comprises a pepper grinder 10 that grinds peppercorn. The pepper grinder 10 comprises a second tubular storage area 11 having a grinding assembly 12. The grinding assembly 12 comprises a spring bar guide 13, grinder ring 14, shaft 15, grinder assembly spring 16, plate adjuster 17, spring adjusting screw lock 18 and adjusting screw 19 all secured to each other in unison.

The upper portion 2 attaches to the bottom portion 9 via a pressure fit clip-top shell 20, spring retaining ring 21 and one or more push buttons 22 that allow a user to easily remove the upper portion 2 from the bottom portion 9 and to rotate the bottom portion 9 to operate the pepper grinder 10.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A combined pepper grinder and salt shaker comprising:
   an upper portion having a first tubular area for storing salt having at least one aperture on a top end for dispensing the salt;
   said upper portion having attachment means on a bottom end for attaching to a second tubular storage area; and
   a bottom portion having a pepper grinder that attaches to the upper portion via a pressure fit clip-top shell, spring retaining ring and one or more push buttons that allow a user to easily remove the upper portion from the bottom portion and to rotate the bottom portion to operate the pepper grinder.

2. The combined pepper grinder and salt shaker of claim 1 wherein:
   said attachment means is a male threaded insert and a corresponding female threaded insert that attach into the shaker top and the first tubular storage area, thereby allowing the shaker top to be removed to allow for replacement of salt or other spices.

3. The combined pepper grinder and salt shaker of claim 1 wherein:
   the pepper grinder comprises a spring bar guide, grinder ring, shaft, grinder assembly spring, plate adjuster and adjusting screw all secured to each other.

4. A combined pepper grinder and salt shaker comprising:
   an upper portion having a first tubular area for storing salt having at least one aperture on a top end for dispensing the salt;
   said upper portion having attachment means on a bottom end for attaching to a second tubular storage area;
   a bottom portion having a pepper grinder that attaches to the upper portion via a pressure fit clip-top shell, spring retaining ring and one or more push buttons that allow a user to easily remove the upper portion from the bottom portion and to rotate the bottom portion to operate the pepper grinder; and
   the upper portion attaches to the bottom portion via the pressure fit clip-top shell, spring retaining ring and one or more push buttons that allow a user to easily remove the upper portion from the bottom portion and to rotate the bottom portion to operate the pepper grinder.

5. The combined pepper grinder and salt shaker of claim 4 wherein:
   said attachment means is a male threaded insert and a corresponding female threaded insert that attach into the shaker top and the first tubular storage area, thereby allowing the shaker top to be removed to allow for replacement of salt or other spices.

6. The combined pepper grinder and salt shaker of claim 4 wherein:
   the pepper grinder comprises a spring bar guide, grinder ring, shaft, grinder assembly spring, plate adjuster and adjusting screw all secured to each other.

7. A combined pepper grinder and salt shaker comprising:
   an upper portion having a first tubular area for storing salt having at least one aperture on a top end for dispensing the salt;
   said upper portion having attachment means on a bottom end for attaching to a second tubular storage area;
   a bottom portion having a pepper grinder that attaches to the upper portion via a pressure fit clip-top shell, spring retaining ring and one or more push buttons that allow a user to easily remove the upper portion from the bottom portion and to rotate the bottom portion to operate the pepper grinder;
   the upper portion attaches to the bottom portion via the pressure fit clip-top shell, spring retaining ring and one or more push buttons that allow a user to easily remove the upper portion from the bottom portion and to rotate the bottom portion to operate the pepper grinder; and
   said attachment means is a male threaded insert and a corresponding female threaded insert that attach into the shaker top and the first tubular storage area, thereby allowing the shaker top to be removed to allow for replacement of salt or other spices.

8. The combined pepper grinder and salt shaker of claim 7 wherein:
   the pepper grinder comprises a spring bar guide, grinder ring, shaft, grinder assembly spring, plate adjuster and adjusting screw all secured to each other.

* * * * *